(12) United States Patent
Cusick et al.

(10) Patent No.: US 7,839,587 B2
(45) Date of Patent: Nov. 23, 2010

(54) COLOR WHEEL

(75) Inventors: Mike Cusick, Greenwood Village, CO (US); Mike Milbourne, El Granada, CA (US); Mike Allen Mann, Conifer, CO (US)

(73) Assignee: Oerlikon Trading AG, Trubbach, Trubbach (CH)

( * ) Notice: Subject to any disclaimer, the term of this patent is extended or adjusted under 35 U.S.C. 154(b) by 231 days.

(21) Appl. No.: 11/844,030

(22) Filed: Aug. 23, 2007

(65) Prior Publication Data

US 2008/0049346 A1 Feb. 28, 2008

Related U.S. Application Data

(60) Provisional application No. 60/823,388, filed on Aug. 24, 2006.

(51) Int. Cl.
*G02B 5/22* (2006.01)
(52) U.S. Cl. .............. 359/892; 359/885; 359/889; 353/84
(58) Field of Classification Search ............ 359/892, 359/885, 889, 890, 891; 353/84
See application file for complete search history.

(56) References Cited

U.S. PATENT DOCUMENTS

| | | | |
|---|---|---|---|
| 4,076,393 A | 2/1978 | Bates | |
| 5,005,947 A * | 4/1991 | Sibilo et al. ............... | 359/819 |
| 5,084,123 A | 1/1992 | Curtis et al. | |
| 5,868,482 A | 2/1999 | Edlinger | |
| 6,555,233 B2 * | 4/2003 | Shishido et al. ............. | 428/432 |
| 6,604,830 B1 | 8/2003 | Chiu et al. | |
| 6,705,733 B1 | 3/2004 | Yu et al. | |
| 2005/0168857 A1 | 8/2005 | Lee et al. | |
| 2006/0051602 A1 | 3/2006 | Iacovangelo et al. | |
| 2006/0126199 A1 * | 6/2006 | Jia ............................ | 359/892 |

FOREIGN PATENT DOCUMENTS

| | | |
|---|---|---|
| EP | 0615146 A2 | 9/1994 |
| EP | 0565218 B1 | 8/1996 |

OTHER PUBLICATIONS

German Search Report dated Aug. 6, 2007.
International Search Report dated Jul. 24, 2007 for application PCT/EP2007/006559.

* cited by examiner

*Primary Examiner*—Audrey Y Chang
(74) *Attorney, Agent, or Firm*—Pearne & Gordon LLP

(57) ABSTRACT

A color wheel has one or a plurality of color filter segments made from a first material, typically glass, having a coefficient of thermal expansion that is substantially different from a carrier, which is made from a second material, typically aluminum. An intermediate washer or coating is disposed in between the segment(s) and the carrier, and has a coefficient of thermal expansion either equal to the segment(s) or in between that of the segment(s) and the carrier. The segment(s) is/are adhered to the washer or coating via a rigid or strong adhesive capable to withstand the strong centrifugal forces associated with rotating the color wheel and the filter segments at high speed.

17 Claims, 4 Drawing Sheets

COLOR WHEEL

This application claims the benefit of U.S. provisional application Ser. No. 60/823,388 filed Aug. 24, 2006, the contents of which are incorporated herein by reference.

FIELD OF THE INVENTION

The present invention relates to color wheels used for projectors to generate color sequential illumination.

DESCRIPTION OF RELATED ART

Devices of the aforementioned type are used in applications where periodic color changes need to be produced in rapid sequence. Examples of optical systems using such devices are for example picture generation devices or display arrangements. Rear or front projection systems for television systems are typical applications.

In order to produce the required rapid color changes, color filters are inserted into the optical light path in rapid sequence. For this purpose a carrier is used that is equipped with circularly arranged filter segments. This arrangement forms a color rotor with parts of the segments radially extending over the carrier and thereby forming a color ring to be inserted into the optical path. This color rotor is to be rotated around its central axis. Through the rotation of the color rotor the filter segments are alternatingly inserted into the optical path and removed from it and thereby the desired rapid color change is produced. In order to realize this rotation the color rotor is fixed to a motor. Color rotor and motor form a color wheel.

Because the picture generation device must be able to produce a high picture quality, the color changes must be executed very rapidly. This means that the filter segments must be moved through the optical path of the light beam at very high speed. Fast rotation of the color rotor is mandatory. As a result large forces due to accelerations which are several hundred times larger than the acceleration g due to gravity act on the color rotor and particularly on the sensitive filter segments; for particularly high picture qualities the accelerations can exceed 1000 g. In addition the radial concentricity of the device must be highly accurate in order to achieve a long operational life of the device. Such picture generation devices must also satisfy very high brightness requirements which can only be achieved with powerful light sources. Through these powerful light sources the device is subjected to correspondingly high temperatures of up to 100° C.

On the other side these products have very often to withstand temperatures as low as −20° C. or even below. For example during transportation around the world to the countries the projectors are sold they, and with them the color wheels, have to cope with such low temperature levels. This is as well often the case when the products are stored before they are sold.

For these reasons the holding power and color stability of the filter segments to the carrier must fulfill very demanding requirements. Broad-scale utilization in so-called low-cost display applications is only feasible if it becomes possible to produce the color wheel at very low costs despite the high quality requirements.

A color wheel with circularly arranged filter segments for use in picture generation devices is described in EP 0 615 146 A2. In this device the filter segments are mounted on a glass ring. One disadvantage with this optical element is the fact that when inserted into the optical path, a high intensity of light has to propagate through an area which comprises adhesive. Most adhesives do not withstand such intensity. The glass ring produces additional light loss which impairs the economy of the overall arrangement.

In U.S. Pat. No. 5,868,482 the plane filter segments are bonded on the periphery of a disc-shaped carrier in such a way that the ring-shaped transparent area between the filter segments in the rotation direction is not interrupted by materials that are optically not transparent. The color filter segments are surface bonded to the carrier in a strip-shaped zone pointing toward the axis of rotation. Surface bonding exists only in a small ring zone area toward the center of the rotation, so that a major portion of the filter segment surface, viewed radially from the axis of rotation toward the outside, remains free as a transparent, ring-shaped useful zone. Additional fixing elements that would require openings such as holes in the filter segments, can be eliminated completely.

U.S. Pat. No. 6,705,733 uses the same concept, however adds a washer on top of the filter segments. The circumferential surface of this washer comprises a groove which may be used for balancing the color wheel. Temperature differences are not discussed at all and the problems related to the temperature cycles are not solved. There is no discussion on material characteristics.

Dependent on the operational speed the choice of the adhesive used to bond the color filter segments to the carrier according to U.S. Pat. No. 5,868,482 is of specific interest. Low operational speeds range from 4,000 rpm to <10,000 rpm and are typically at about 7,200 rpm. High operational speeds range from 10,000 rpm to 25,000 rpm and are typically at 14,400 rpm. Soft adhesives tend to delaminate when operational speeds are high. Stress analysis showed that rigid adhesives lead to failure due to glass cracking when storage at cold temperature is simulated. One hypothesis why such cracking happens relates to the difference in the coefficients of thermal expansion of the segment material and the material of the carrier.

Therefore there is a need for a color wheel based on typical materials that is suitable for high rotational speed applications and able to withstand temperature ranges down from −20° C. up to at least 80° C. without being adversely affected.

It is therefore an objective of the present invention to provide such a color wheel as well as a method for fabricating such a color wheel.

SUMMARY OF THE INVENTION

The objective can be accomplished by modifying the color wheel as described in U.S. Pat. No. 5,868,482 in so far that the segments are not glued directly onto the pivotable carrier connected to the motor. According to the present invention a washer is introduced between the segments and the pivotable carrier, wherein the washer has a coefficient of thermal expansion similar to that of the material used for the color filter segments.

A color wheel is provided and includes a carrier adapted to couple to a motor for rotation of the color wheel. The carrier is made of a first material having a first coefficient of thermal expansion ("CTE1"). The color wheel also includes a color filter segment made of a second material having a second coefficient of thermal expansion ("CTE2"), and a washer made of a third material having a third coefficient of thermal expansion ("CTE3"). The washer has a first surface adhered to said carrier via a first adhesive and a second surface adhered to said color filter segment via a second adhesive. At least one of the following is satisfied: CTE3=CTE2 and abs (CTE3−(CTE1+CTE2)/2)<abs((CTE1−CTE2)/2). The first adhesive is less rigid than the second adhesive.

A color wheel is provided and includes a carrier adapted to couple to a motor for rotation of the color wheel. The carrier is made of a first material having a first coefficient of thermal expansion ("CTE1"). The color wheel also includes a color filter segment made of a second material having a second coefficient of thermal expansion ("CTE2"), and a coating made of a third material having a third coefficient of thermal expansion ("CTE3") over the carrier. The color filter segment is adhered to the coating over said carrier. At least one of the following is satisfied: CTE3=CTE2 and abs(CTE3−(CTE1+CTE2)/2)<abs((CTE1−CTE2)/2).

A method for fabrication of color wheel is also provided, and includes the following steps: a) providing a carrier made of a first material having a first coefficient of thermal expansion ("CTE1") that is adapted to be coupled to a motor for rotation thereof, b) providing one of i) a coating over the carrier or ii) a washer having a first surface adhered to the carrier via a first adhesive, wherein the coating or washer is made of a second material having a second coefficient of thermal expansion ("CTE2"), and c) adhering a color filter segment made of a third material having a third coefficient of thermal expansion ("CTE3") to the coating or to a second surface of the washer, whichever is selected from step (b), wherein the material of the coating or washer is selected based on the materials of the carrier and filter segment so that at least one of the following is satisfied: CTE3=CTE2 and abs(CTE3−(CTE1+CTE2)/2)<abs((CTE1−CTE2)/2).

DETAILED DESCRIPTION OF THE INVENTION

In the following the invention is explained in more detail with the help of the figures and the corresponding embodiments as examples.

Figure 1A:
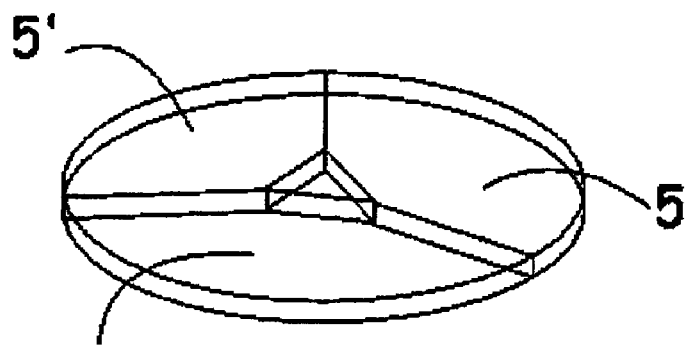
FIG. 1A shows the exploded view of a first embodiment of the present invention, comprising a single washer.

FIG. 1A shows the exploded view of a first embodiment of the present invention.

Figure 1B:
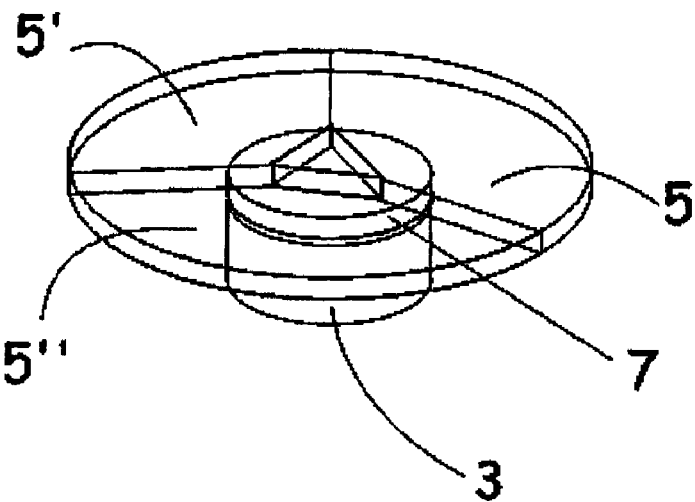
FIG. 1B shows the embodiment according to FIG. 1A in assembled form.

FIG. 1B shows the embodiment according to FIG. 1A in assembled form. The color rotor 1 shown comprises a pivotable carrier 3, color filter segments 5, 5', 5" and a washer 7.

The pivotable carrier 3 needs to be easy to fabricate and light weight. Therefore typically the material for the pivotable carrier is aluminum or an aluminum alloy, which has a coefficient of thermal expansion of about $23 \times 10^{-6}$/K at 20° C. Hereinafter the such coefficients are abbreviated "CTE," and reported as values times $10^6$·K for the condition of 20° C.; i.e. a CTE of 5 ("CTE=5") means the corresponding coefficient of thermal expansion is $5 \times 10^{-6}$/K at 20° C.

The color filter segments 5, 5', 5" are produced in such a way that the transparent substrate sheets are coated with a thin film interference coating in order to reflect part of the visible spectrum and to transmit the remaining part of the visible spectrum. After coating these glass sheets they are cut down to the required segmented shape. Glass can be cut with the fast and reliable scribe and break method. Therefore, typically the material for the substrates for color filter segments is glass. The CTE of different glasses typically ranges from 0.5 (e.g. quarz) to 10. In the example as discussed within this specification, the material is BK7 glass with a CTE of 7.1.

The pivotable aluminum carrier and glass segments have very different CTEs. If the glass segments are glued directly onto the pivotable aluminum carrier with an adhesive, the adhesive has to be soft enough in order to be able to buffer this difference. In most cases the strength of the adhesive is directly linked to its rigidity.

According to the first embodiment of the present invention the glass segments 5, 5', 5" are glued to a glass washer 7. The glass washer 7 has at least approximately the same CTE as the CTE of the material of the glass segments 5, 5', 5". Therefore a rigid and strong adhesive may be used for fixing the glass segments 5, 5', 5" to the washer 7. The glass washer 7 could be a solid disc shaped washer or a ring shaped washer (having an opening at the center). The diameter of the glass washer is small compared to the diameter of the color filter ring formed by the color filter segments. Therefore the color filter segments form an outer transparent ring for transmitting light and in contrast to prior art as described in EP 0 615 146 A2 the light does not have to transmit through two glass sheets and/or an adhesive layer. In addition please note, that due to the possibility to use a rigid and therefore strong adhesive, the area for gluing the segments may be chosen smaller as compared to prior art in U.S. Pat. No. 5,868,482.

This assembled ring may now be fixed to the pivotable aluminum carrier 3. With respect to centrifugal forces, the glass washer 7 already secures and stabilizes the glass segments 5, 5', 5". The connection between pivotable aluminum carrier 3 and glass washer 7 needs only to withstand and transmit the rotational forces for accelerating the wheel and keeping it in rotation. This is by far less demanding than the connection of the glass segments 5, 5', 5" to the glass washer 7. Therefore even for high speed rotations a weaker or less rigid adhesive may be used to realize the adhesion between glass washer 7 and the pivotable aluminum carrier 3. The less rigid (softer) adhesive will be better able to dampen unmatched thermal expansion between the aluminum carrier 3 and the glass washer 7 due to their differing CTEs.

According to a second embodiment of the present invention, the glass washer 7 is replaced by a metal washer where the CTE of the metal washer is significantly below the CTE of the aluminum washer and equal to or above the CTE of the glass segments. In a preferred embodiment, the washer material is selected to satisfy the following relation: abs(CTE2−(CTE3+CTE1)/2)<abs((CTE3−CTE1)/2), wherein the notation "abs" refers to the mathematical operator for absolute value, CTE1 is the CTE of the color filter segment(s) 5, 5', 5" (preferably glass), CTE2 is the CTE of the washer and CTE3 is the CTE of the carrier (preferably aluminum). Examples of suitable washer materials may include iron (CTE=12.2), steel (CTE=13.0), nickel (CTE=13.0), platinum (CTE=9.0) or titanium (CTE=10.8) and alloys of these metals. In terms of material durability and adhesion to the pivotable aluminum carrier, titanium would be a good choice. However in view of the lower cost stainless steel-410, with a CTE of 9.9, is a preferred choice. (Please note that the number "410" specifies the steel and is not a reference number of this disclosure). If even lower costs are to be realized, one could also use a steel washer and apply a protection coating to prevent rusting. The glass segments are fixed to the stainless steel washer by using a strong adhesive. This is possible because the CTE of stainless steel-410 is close to the CTE of the glass. In contrast to glass, metals are not brittle; they are materials with high plasticity (elasticity). Therefore, if the stainless steel washer is chosen thick enough, the washer can be rigidly adhered to the pivotable carrier. The plasticity of the metal will cause low stress factors within the assembly when temperature is changing. The metal washer itself buffers the difference in CTE of the pivotable aluminum carrier and the glass segments.

It goes without saying that one could use for the washer other materials having appropriate CTE values. For example with ceramics as well with plastics a wide range of CTEs could be realized, good for use as a washer in order to buffer the difference in CTE of the glass to the CTE of the carrier material.

Figure 2A:
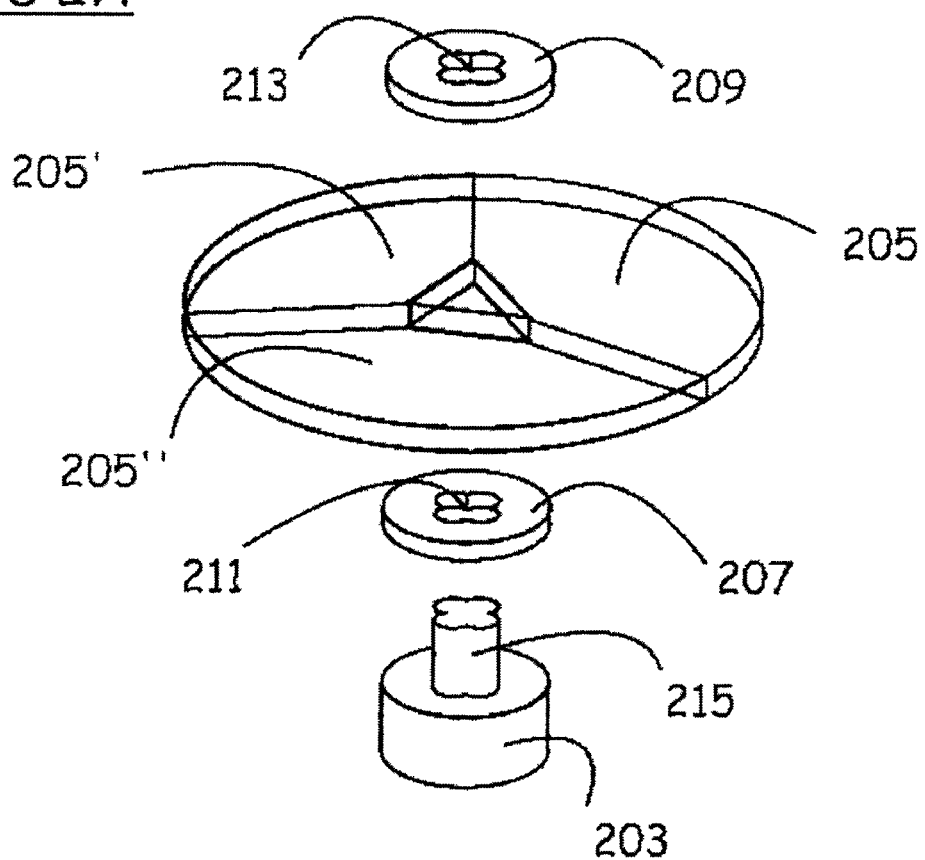
FIG. 2A shows a second embodiment of the present invention in an exploded view, sandwiching segments between two washers.

FIG. 2A shows a second embodiment of the present invention in an exploded view. Shown in FIG. 2A is a version of the color rotor with a pivotable aluminum carrier 203, first washer 207, second washer 209 and glass filter segments 205, 205', 205".

The glass filter segments 205, 205', 205" are sandwiched between the first washer 207 and the second washer 209. The washer material is glass or metal, with a CTE which is significantly below the CTE of aluminum. Preferably the washer material is stainless steel-410.

As shown in FIG. 2A the washers 207, 209 and the pivotable aluminum carrier 203 may comprise features for a keyhole and key system. In the example the washers 207, 209 comprise central holes 211 and 213 which are not rotational symmetric, and the pivotable aluminum carrier 203 comprises a snuggly fitting key feature or member 215. As will be appreciated, the key feature or member 15 is dimensioned to be complementarily accommodated and received in the holes 211 and 213, which comprise keyway openings for the key member 215.

Figure 2B:
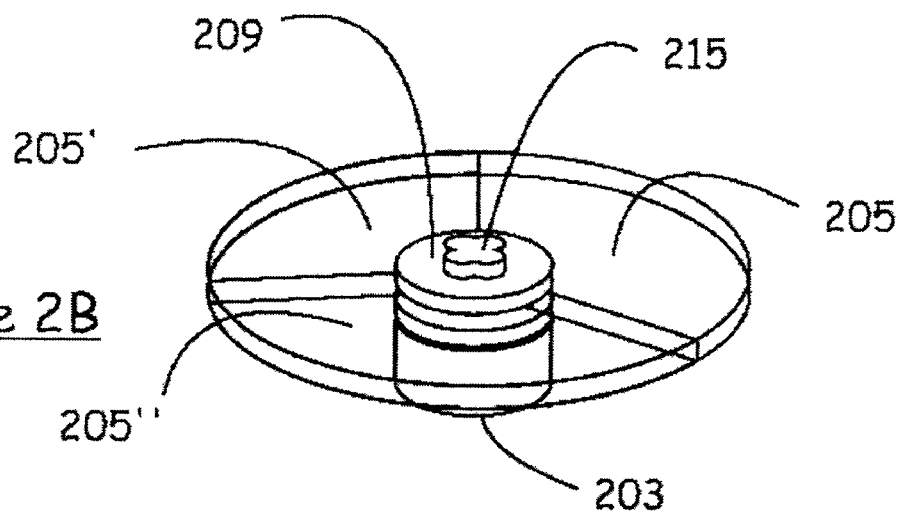
FIG. 2B shows the embodiment according to FIG. 2A in assembled form.

FIG. 2B shows the assembled color rotor according to the second embodiment as shown and discussed for FIG. 2A. The glass filter segments 205, 205', 205" may be glued to the first washer 207 or the second washer 209 or both. Please note that key feature 215 and washer 209 may comprise elements which allow one to fix the washer 209 to the feature 215 by a snapping mechanism. No adhesive is required for this type of connection, although adhesive might be used in addition. Alternatively to a snapping mechanism, a welding method could be used to fix the washer 209.

Figure 3:
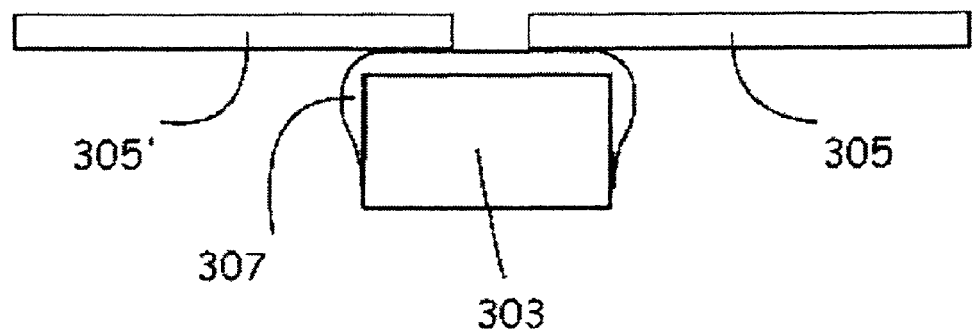
FIG. 3 shows a cross-section of a third embodiment of the present invention, replacing the washer with a coating.

FIG. 3 shows a cross section of a fourth embodiment of the present invention. Shown are two glass segments 305, 305', fixed to a pivotable aluminum carrier 303. The pivotable aluminum carrier 303 is coated with a layer 307 (that can be metal, ceramic, etc.), which has a significantly lower CTE than aluminum. Preferably a metal layer 307 is a titanium layer, however other metals may be used as well. The glass filter segments 305, 305' are fixed to the layer 307 using a rigid and therefore potentially strong adhesive. Due to the elasticity of the layer 307 it can act as a buffer, relaxing the stress due to the difference in CTE of the pivotable aluminum carrier 303 and the glass filter segments 305, 305'.

With respect to thickness of the washers one could note that they have to be thick enough in order to be able to handle them easily. This results in a lower limit of about 20 µm of thickness. With respect to maximum thickness, a thickness of less than 5 mm is preferred in order not to increase the dimensions of the rotor too much.

Figure 4A:
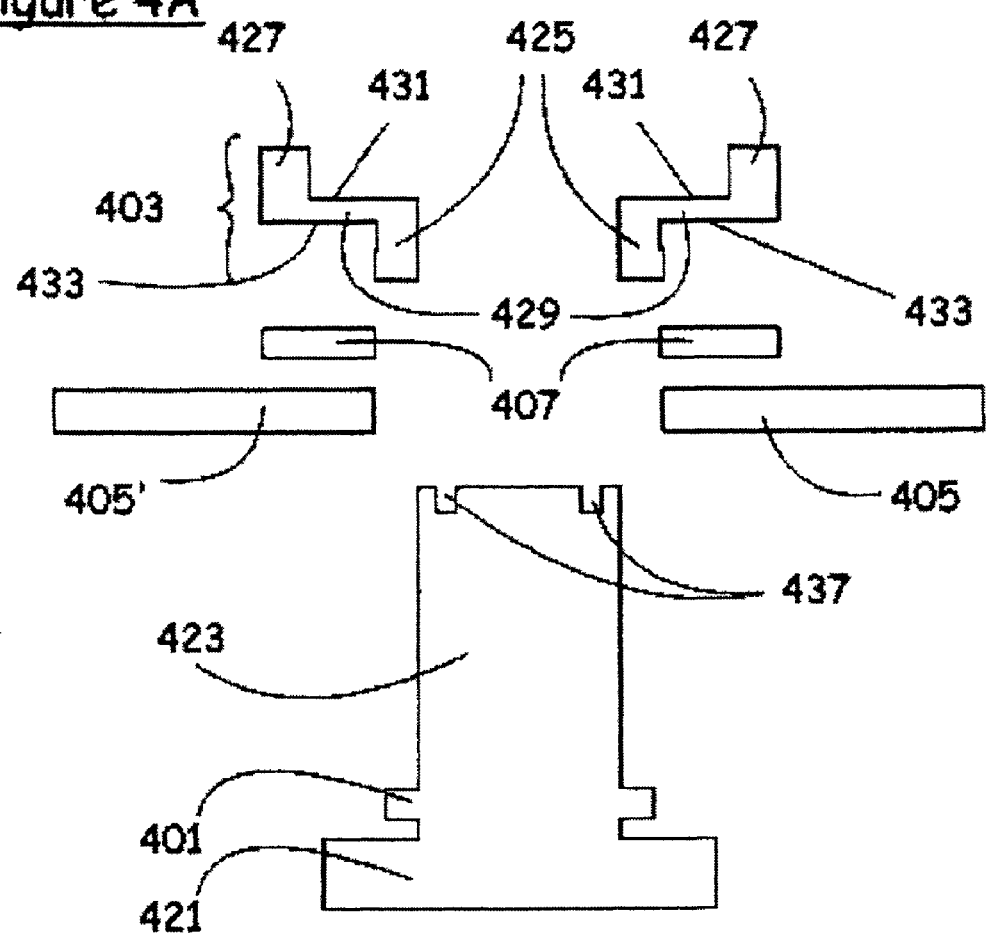
FIG. 4A shows a fourth embodiment of the present invention in an exploded view.
Figure 4B:
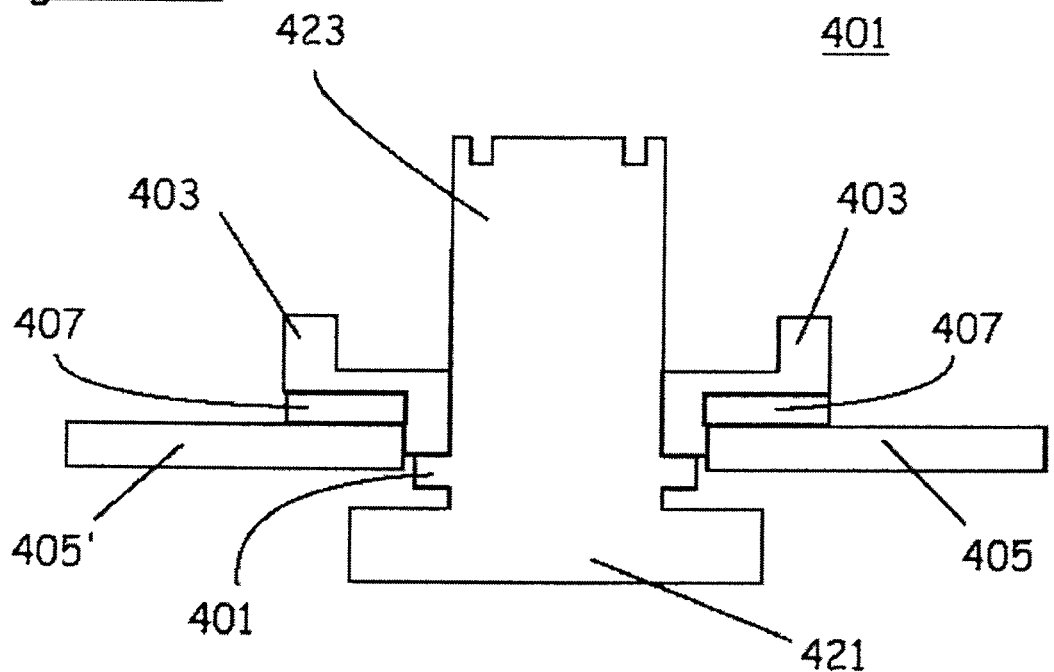
FIG. 4B shows the embodiment according to FIG. 4A in assembled form.
Figure 4C:
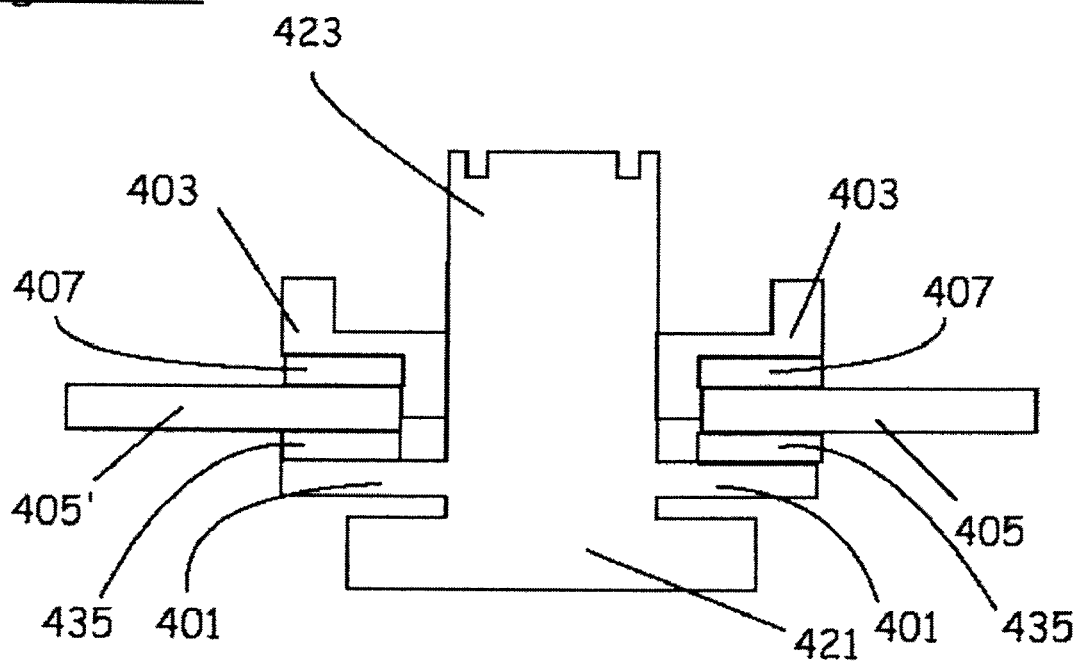
FIG. 4C shows a modification of the fourth embodiment.

FIGS. 4A to 4C show another embodiment according to the present invention. Shown in FIG. 4A is the exploded view of a color wheel assembly with a motor 421 comprising a cylindrical pivotable first carrier 423. Slipped on the first carrier 423 is a ring shaped second carrier 403. The first carrier 423 comprises means 401 for stopping and holding the ring shaped second carrier 403 in position.

The ring shaped second carrier 403 is comprised of two hollow cylinders 425, 427 with different diameters merged by a connection ring 429. The inner surface of one cylinder 425 is snuggly fitting to the surface of the first carrier 423. The connection ring 429 comprises an upper surface 431 and a lower surface 433.

Attached to the lower surface is a washer 407 preferably made of stainless steel-410. Attached to the washer 407 are color filter segments 405, 405'. Stainless steel-410 has a CTE which is closer to the CTE of the glass used than the CTE of aluminum. Therefore less stress is exerted on the glass substrate of the color filter segments 405, 405' when the color wheel experiences different temperatures.

A rigid and therefore strong adhesive may be used to attach the segments 405, 405' to the washer 407. A soft (less rigid) adhesive may be used to attach the washer to the second carrier 403. The assembled color wheel is shown in FIG. 4B.

Please note that no adhesive at all is required to fix the washer 407 to the second carrier 403, if a second washer 435 of stainless steel-410 is attached to the segments 405, 405' on the side opposite to the first washer 407 and the means 401 for stopping are chosen so that they act upon or engage the second washer 435. This is shown in FIG. 4C.

Preferably the color wheel assembly comprises as well means for balancing the color wheel. In our example the other cylinder 427 of the second carrier 403 together with the connection ring 429 and the surface of the first carrier 423 form a container where balancing material could be filled in. Shown in the figures are as well circular grooves 437 in the top plane of the first carrier 423, which could be used to fill in balancing material. Therefore the color wheel assembly as shown in the FIGS. 4A-4C provides for the possibility to perform dual plane balancing.

Although the invention has been described in connection with certain exemplary embodiments, it is to be understood that numerous variations and modifications thereto could be made by persons of ordinary skill in the art without departing from the spirit and the scope of the invention as set forth in the appended claims.

What is claimed is:

1. A color wheel comprising a carrier adapted to couple to a motor for rotation of the color wheel, said carrier being made of a first material having a first coefficient of thermal expansion ("CTE1"), a color filter segment made of a second material having a second coefficient of thermal expansion ("CTE2"), and a washer made of a third material having a third coefficient of thermal expansion ("CTE3"), said washer having a first surface adhered to said carrier via a first adhesive and a second surface adhered to said color filter segment via a second adhesive, wherein the following is satisfied: abs(CTE3−(CTE1+CTE2)/2)<abs((CTE1−CTE2)/2), and wherein said first adhesive is less rigid than said second adhesive.

2. The color wheel of claim 1, comprising a plurality of said color filter segments made of said second material and adhered to said washer via said second adhesive.

3. The color wheel of claim 2, terminal portions of said color filter segments extending beyond the washer and the carrier to thereby form a ring-shaped area of the color filter segments through which the passage of light is unobstructed by either said carrier or said washer.

4. The color wheel of claim 1, said washer being made of metal.

5. The color wheel of claim 4, said washer being made of stainless steel.

6. The color wheel of claim 1, said carrier being made of aluminum or an aluminum alloy.

7. The color wheel of claim 6, said color filter segment being made of glass.

8. The color wheel of claim 6, said color filter segment being made of plastic.

9. The color wheel of claim 1, said washer being solid disc shaped.

10. The color wheel of claim 1, said washer being ring shaped.

11. A color wheel comprising a carrier adapted to couple to a motor for rotation of the color wheel, said carrier being made of a first material having a first coefficient of thermal expansion ("CTE1"), a color filter segment made of a second material having a second coefficient of thermal expansion ("CTE2"), and a coating made of a third material having a third coefficient of thermal expansion ("CTE3") over said carrier, said color filter segment being adhered to said coating over said carrier, wherein the following is satisfied: $\mathrm{abs(CTE3-(CTE1+CTE2)/2) < abs((CTE1-CTE2)/2)}$.

12. The color wheel of claim 11, said coating being titanium.

13. The color wheel of claim 11, said carrier being made from aluminum and said color filter segment being made from glass or plastic.

14. The color wheel of claim 12, said carrier being made from aluminum and said color filter segment being made from glass or plastic.

15. The color wheel of claim 11, comprising a plurality of said color filter segments made of said second material and adhered to said coating.

16. The color wheel of claim 15, terminal portions of said color filter segments extending beyond the carrier and said coating to thereby form a ring-shaped area of the color filter segments through which the passage of light is unobstructed by either said carrier or said coating.

17. A method for fabrication of color wheel, comprising:
a) providing a carrier made of a first material having a first coefficient of thermal expansion ("CTE1") that is adapted to be coupled to a motor for rotation thereof,
b) providing one of i) a coating over said carrier or ii) a washer having a first surface adhered to said carrier via a first adhesive, said coating or washer being made of a second material having a second coefficient of thermal expansion ("CTE2"),
c) adhering a color filter segment made of a third material having a third coefficient of thermal expansion ("CTE3") to said coating or to a second surface of said washer, whichever is selected from step (b),
wherein the material of said coating or washer is selected based on the materials of said carrier and filter segment so that the following is satisfied: $\mathrm{abs(CTE3-(CTE1+CTE2)/2) < abs((CTE1-CTE2)/2)}$.

* * * * *